(12) United States Patent
Singh et al.

(10) Patent No.: US 9,321,655 B2
(45) Date of Patent: Apr. 26, 2016

(54) SYSTEMS AND METHODS FOR PRODUCING SYNGAS AND PRODUCTS THEREFROM

(75) Inventors: Shashi Prakash Singh, Missouri City, TX (US); Xueqian Lin, Kingwood, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 351 days.

(21) Appl. No.: 12/859,714

(22) Filed: Aug. 19, 2010

(65) Prior Publication Data

US 2011/0206594 A1  Aug. 25, 2011

Related U.S. Application Data

(60) Provisional application No. 61/235,639, filed on Aug. 20, 2009.

(51) Int. Cl.
| | | |
|---|---|---|
| *C01C 1/04* | (2006.01) | |
| *C01B 3/02* | (2006.01) | |
| *C01B 3/38* | (2006.01) | |

(52) U.S. Cl.
CPC .............. *C01C 1/0405* (2013.01); *C01B 3/025* (2013.01); *C01B 3/382* (2013.01); *C01C 1/0476* (2013.01); *C01C 1/0488* (2013.01); *C01B 2203/0233* (2013.01); *C01B 2203/0244* (2013.01); *C01B 2203/0283* (2013.01); *C01B 2203/042* (2013.01); *C01B 2203/043* (2013.01); *C01B 2203/0405* (2013.01); *C01B 2203/047* (2013.01); *C01B 2203/0415* (2013.01); *C01B 2203/0445* (2013.01); *C01B 2203/0475* (2013.01); *C01B 2203/0495* (2013.01); *C01B 2203/068* (2013.01); *C01B 2203/0811* (2013.01); *C01B 2203/0822* (2013.01); *C01B 2203/0827* (2013.01); *C01B 2203/0844* (2013.01); *C01B 2203/1235* (2013.01); *C01B 2203/141* (2013.01); *C01B 2203/142* (2013.01); *C01B 2203/146* (2013.01); *C01B 2203/147* (2013.01); *C01B 2203/148* (2013.01); *C01B 2203/84* (2013.01); *Y02P 20/128* (2015.11)

(58) Field of Classification Search
CPC ............. C01C 1/04–1/0488; C01B 3/22–3/30; C01B 3/32–3/48; C01B 2210/0065; C01B 2210/0082; C01B 2210/0009

USPC .......................................... 423/359–363, 352
See application file for complete search history.

(56) References Cited

U.S. PATENT DOCUMENTS

| | | | |
|---|---|---|---|
| 2,610,106 A * | 9/1952 | Worth ........................... | 423/362 |
| 3,598,527 A * | 8/1971 | Quartulli et al. .............. | 423/361 |
| 4,578,214 A * | 3/1986 | Jungerhans .................... | 252/376 |
| 4,728,506 A * | 3/1988 | Habermehl et al. ........... | 423/359 |
| 4,750,925 A * | 6/1988 | MacLean et al. .............. | 62/624 |
| 4,846,851 A * | 7/1989 | Guro et al. ..................... | 95/100 |
| 4,904,455 A | 2/1990 | Karafian et al. | |
| 5,122,299 A * | 6/1992 | LeBlanc ......................... | 252/376 |
| 5,181,937 A * | 1/1993 | Karafian et al. ................ | 48/95 |
| 5,252,609 A * | 10/1993 | Pinto ............................. | 518/703 |
| 5,496,859 A | 3/1996 | Fong et al. | |
| 7,670,586 B2 | 3/2010 | Wang et al. | |
| 2004/0057898 A1* | 3/2004 | Singh et al. .................... | 423/652 |
| 2008/0161428 A1* | 7/2008 | Strait ............................. | 518/702 |
| 2010/0016635 A1* | 1/2010 | Singh ............................. | 564/66 |
| 2010/0132259 A1* | 6/2010 | Haque ........................... | 48/62 R |

FOREIGN PATENT DOCUMENTS

| | | |
|---|---|---|
| EP | 0227807 B1 | 11/1991 |
| WO | 2006/117499 A1 | 11/2006 |
| WO | 2008/122399 A1 | 10/2008 |

OTHER PUBLICATIONS

International Search Report for PCTUS2010/046086.*

* cited by examiner

*Primary Examiner* — Anthony J Zimmer
(74) *Attorney, Agent, or Firm* — Gary M. Machetta (57) ABSTRACT

Systems and methods for producing syngas and ammonia are provided. The method can include reforming a hydrocarbon in a first reaction zone in the presence of one or more first catalysts and steam at conditions sufficient to produce an effluent comprising a portion of the hydrocarbon, carbon monoxide, carbon dioxide, and hydrogen. The effluent can be reformed in a second reaction zone in the presence of one or more second catalysts and nitrogen at conditions sufficient to produce a syngas comprising methane, hydrogen, nitrogen, carbon monoxide, and carbon dioxide, or any combination thereof. At least a portion of the nitrogen and hydrogen in the syngas can be converted to ammonia to produce an ammonia effluent. The ammonia effluent can be separated to produce an ammonia product and a purge gas comprising nitrogen. At least a portion of the purge gas can be recycled to the hydrocarbon, the effluent, or a combination thereof.

25 Claims, 1 Drawing Sheet

SYSTEMS AND METHODS FOR PRODUCING SYNGAS AND PRODUCTS THEREFROM

CROSS REFERENCE TO RELATED APPLICATION

This application claims the benefit of U.S. Provisional Patent Application Ser. No. 61/235,639, filed on Aug. 20, 2009, which is incorporated by reference herein.

BACKGROUND

1. Field

Embodiments of the present disclosure generally relate to systems and methods for producing syngas. More particularly, embodiments of the present disclosure relate to systems and methods for producing syngas and ammonia therefrom.

2. Description of the Related Art

Ammonia is commonly produced by reacting hydrogen and nitrogen in the presence of a catalyst in what is commonly referred to as an ammonia converter. A typical syngas contains a mixture of hydrogen, nitrogen, carbon monoxide, and carbon dioxide, and an ideal syngas for ammonia synthesis will have a molar ratio of 3 moles hydrogen to 1 mole nitrogen. The conversion of the syngas produces an ammonia product.

Conventional syngas production introduces a hydrocarbon to a fired steam reformer and contacts a hydrocarbon with a steam reforming catalyst. The primary reformed hydrocarbon is then introduced to a secondary reformer where hydrogen and unreformed hydrocarbons are partially oxidized with an oxidant and further reformed in the presence of a catalyst. The source of nitrogen is typically from the oxidant and/or nitrogen introduced to the secondary reformer along with the hydrocarbon.

During periods of increased temperature, e.g., summer months, the amount of nitrogen available for syngas production decreases due to the reduced density of the ambient air. As such, typical ammonia plants experience a decrease in ammonia production that otherwise would not occur if the source of nitrogen could be maintained at sufficient levels year round.

There is a need, therefore, for improved systems and methods for producing syngas and ammonia therefrom.

DETAILED DESCRIPTION

Systems and methods for producing syngas and ammonia are provided. In one or more embodiments, a hydrocarbon can be reformed in a first reaction zone in the presence of one or more first catalysts and steam at conditions sufficient to produce an effluent. The effluent can include, but is not limited to, about 10 mol % to about 40 mol % of the hydrocarbon, about 5 mol % to about 20 mol % carbon monoxide, about 10 mol % to about 20 mol % carbon dioxide, and about 40 mol % to about 60 mol % hydrogen. The effluent can be reformed in a second reaction zone in the presence of one or more second catalysts and nitrogen at conditions sufficient to produce a syngas. The resulting syngas can include, but is not limited to, about 10 mol % or less methane, about 40 mol % to about 60 mol % hydrogen, about 20 mol % to about 30 mol % nitrogen, about 5 mol % to about 15 mol % carbon monoxide, and about 10 mol % to about 20 mol % carbon dioxide. At least a portion of the nitrogen and hydrogen in the syngas can be converted to ammonia to produce an ammonia effluent. The ammonia effluent can be separated to produce an ammonia product and a purge gas. The purge gas can include nitrogen, and at least a portion thereof can be recycled to the hydrocarbon, the effluent, or a combination thereof to maintain sufficient levels of nitrogen in the syngas resulting in consistent ammonia production. The purge gas can also include hydrogen, methane, or a combination thereof, and, as such, recycling at least a portion of the purge gas can also increase the concentration of hydrogen in the syngas. Increasing the concentration of hydrogen in the syngas can reduce the amount of the hydrocarbon required in order to produce a given amount of syngas.

Figures 1, 2:
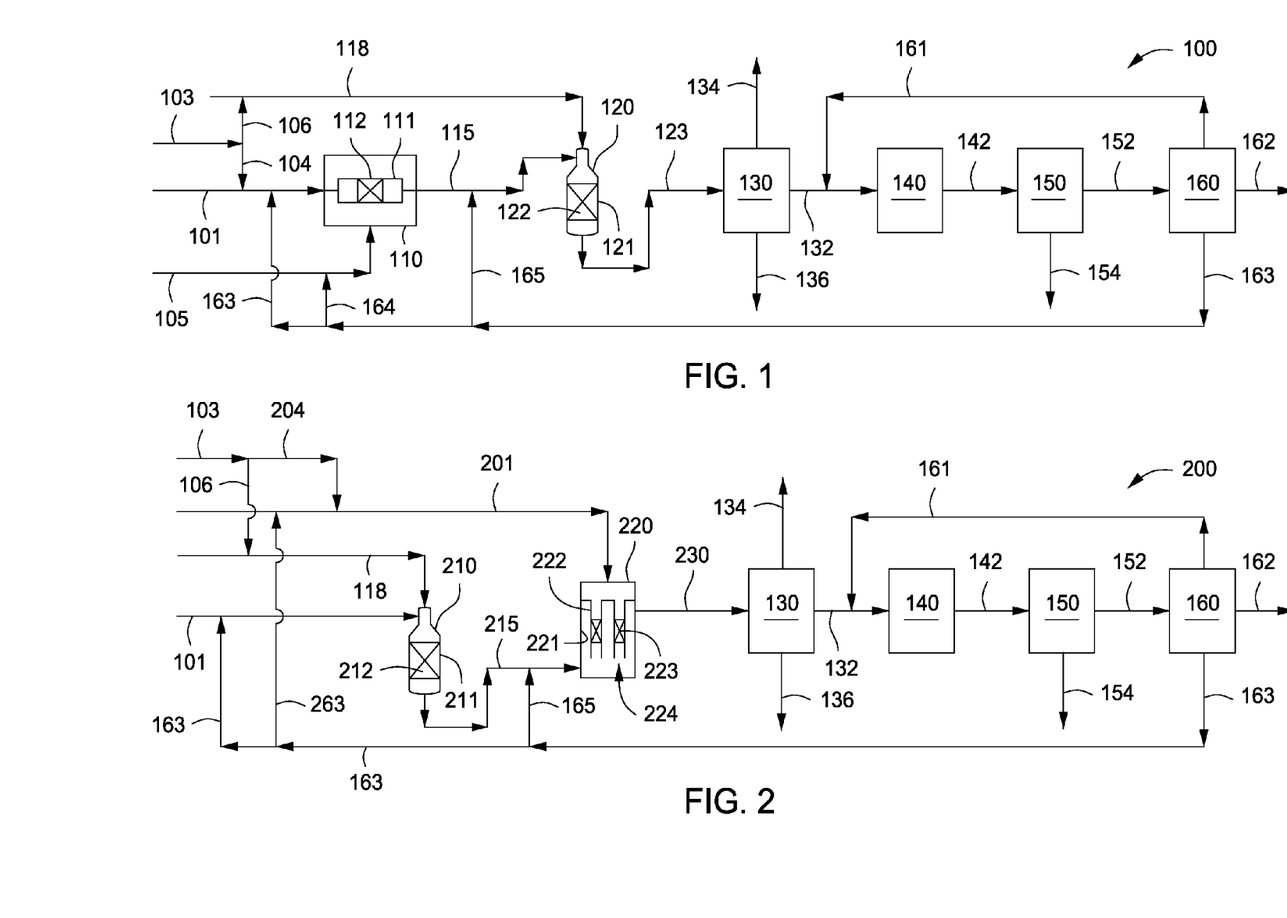
FIG. 1 depicts a schematic of an illustrative system for producing syngas and ammonia, according to one or more embodiments described.
FIG. 2 depicts a schematic of another illustrative system for producing syngas and ammonia, according to one or more embodiments described.

FIG. 1 depicts a schematic of an illustrative system 100 for producing syngas and ammonia, according to one or more embodiments. The system 100 can include one or more first reformers 110, second reformers 120, purification units 130, compressors 140, ammonia synthesis units 150, and purge gas recovery units 160. A hydrocarbon via line 101 can be introduced to the first reformer 110. Steam in line 103 can be introduced via line 104 to the hydrocarbon in line 101 to produce a hydrocarbon/steam mixture. Although not shown, the steam via line 104 can be introduced directly to the first reformer 110. The hydrocarbon or the hydrocarbon/steam mixture introduced via line 101 to the first reformer 110 can be at least partially reformed within a first reaction zone 111 in the presence of a first catalyst 112 at conditions sufficient to produce a first reformed hydrocarbon or effluent via line 115. The effluent in line 115 can include, but is not limited to, a portion of the hydrocarbon, carbon monoxide, carbon dioxide, hydrogen, steam, or any combination thereof.

A fuel via line 105 can be introduced to the first reformer 110. The fuel in line 105 can be combusted within the first reformer 110 to provide or produce heat therein. At least a portion of the heat can be transferred to the hydrocarbon or the hydrocarbon/steam mixture within the first reaction zone 111 to produce the effluent via line 115. The heat can be used to drive or promote the reforming reactions within the first reformer 110.

The effluent via line 115 can be introduced to the second reformer 120 to produce a second reformed hydrocarbon or syngas via line 123. The syngas in line 123 can include, but is not limited to, hydrogen, carbon monoxide, carbon dioxide, nitrogen, argon, or any combination thereof. An oxidant via line 118 can also be introduced to the second reformer 120. The oxidant can be used to combust a portion of the effluent introduced via line 115 to produce heat. At least a portion of the heat can be used to promote or drive the endothermic reforming reactions of the first effluent within the second reaction zone 121 in the presence of the second catalyst 122. Steam in line 103 can also be introduced via line 106 to the second reformer 120. For example, steam via line 106 can be mixed with the oxidant in line 118 and a mixture of steam and oxidant can be introduced to the second reformer 120. The amount of steam via line 106 introduced to the oxidant in line 118 can produce an oxidant that contains about 1 vol %, about 3 vol %, about 5 vol %, about 7 vol %, or about 10 vol % steam. Although not shown, the steam via line 106 can be introduced directly to the second reformer 120 and/or the effluent in line 115, in combination to or in lieu of mixing with the oxidant in line 118.

The oxidant via line 118 introduced to the second reformer 120 can be or include any suitable oxygen containing material or combination of materials. Illustrative oxidants can include, but are not limited to, air, oxygen, essentially oxygen, oxygen-enriched air, oxygen-lean air, hydrogen peroxide, ozone, a mixture of oxygen and one or more gases such as air, water, carbon dioxide, nitrogen, hydrogen peroxide, ozone, and/or argon, or any combination thereof. The oxidant in line 118 can contain from about 1 vol % to about 100 vol % oxygen. As used herein, the term "essentially oxygen" refers to an oxidant containing more than 50 vol % oxygen. For example, an essentially oxygen fluid could contain from about 55 vol % to about 100 vol % oxygen. As used herein, the term "oxygen-enriched air" refers to an oxidant containing more than about 21 vol % oxygen and up to 50 vol % oxygen. As used herein, the term "oxygen-rich" refers to both oxygen-enriched air and essentially oxygen. As used herein, the term "oxygen-lean air" refers to an oxidant that contains less than about 20 vol % oxygen. The oxidant in line 118 can be nitrogen-free or essentially nitrogen-free. As used herein, the term "essentially nitrogen-free" refers to an oxidant in line 118 containing about 5 vol % nitrogen or less, 4 vol % nitrogen or less, 3 vol % nitrogen or less, 2 vol % nitrogen or less, or 1 vol % nitrogen or less. Oxygen, essentially oxygen, and/or oxygen-enriched air can be produced from any number of conventional oxygen enrichment systems, such as an air separation unit.

The oxidant in line 118 can be compressed using one or more compressors (not shown) to provide a compressed oxidant in line 118. In at least one embodiment, the oxidant via line 118 can be compressed air. The pressure of the compressed oxidant in line 118 can range from a low of about 700 kPa, about 1,000 kPa, or about 1,400 kPa to a high of about 5,000 kPa, about 7,000 kPa, or about 9,000 kPa. For example, the pressure of the compressed oxidant in line 118 can range from about 2,940 kPa to about 7,850 kPa.

A recycle gas via line 163 produced from the purge gas recovery unit 160 downstream from the first and second reformers 110, 120 can be recycled to any number of locations or combination of locations within the system 100. For example, the recycle gas via line 163 can be recycled to the hydrocarbon in line 101. In another example, the recycle gas in line 163 can be recycled via line 164 to the fuel in line 105. In another example, the recycle gas in line 163 can be recycled via line 165 to the effluent in line 115. In other words, the recycle gas in line 163 can be recycled via line 163 to the hydrocarbon in line 101, recycled via line 164 to the fuel in line 105, recycled via line 165 to the effluent in line 115, or any combination thereof. As such, the hydrocarbon in line 101, the fuel in line 105, the effluent in line 115, and/or the syngas in line 123 can include at least a portion of the recycle gas in line 163 produced from the purge gas recovery unit 160.

In one or more embodiments, the purge gas recovery unit 160 can recover at least a portion of any hydrogen contained in a purge gas introduced thereto via line 152 to produce a hydrogen-rich recycle gas via line 161 and a hydrogen-lean recycle gas via line 163. The purge gas can include, but is not limited to, hydrogen, methane, nitrogen, argon, or any combination thereof. The purge gas in line 152 can have a hydrogen concentration ranging from a low of about 20 mol %, about 25 mol %, about 30 mol %, about 35 mol %, about 40 mol %, or about 45 mol % to a high of about 60 mol %, about 65 mol %, or about 70 mol %. The purge gas in line 152 can have a methane concentration ranging from a low of about 2 mol %, about 4 mol %, or about 6 mol % to a high of about 15 mol %, about 17 mol %, or about 20 mol %. The purge gas in line 152 can have a nitrogen concentration ranging from a low of about 15 mol %, about 18 mol % or about 20 mol % to a high of about 23 mol %, about 25 mol %, or about 30 mol %. The purge gas in line 152 can have an argon concentration ranging from a low of about 1 mol %, about 2 mol %, or about 3 mol % to a high of about 4 mol %, about 5 mol %, or about 6 mol %.

The hydrogen-lean recycle gas in line 163 recovered from the purge gas recovery unit 160 can include methane, hydrogen, nitrogen, argon, or any combination thereof. The nitrogen concentration in the hydrogen-lean recycle gas in line 163 can range from a low of about 10 mol %, about 20 mol %, or about 30 mol % to a high of about 55 mol %, about 65 mol %, or about 70 mol %. The methane concentration in the hydrogen-lean recycle gas in line 163 can range from a low of about 1 mol %, about 5 mol %, or about 10 mol % to a high of about 15 mol %, about 18 mol %, or about 20 mol %. The hydrogen concentration in the hydrogen-lean recycle gas in line 163 can range from a low of about 5 mol %, about 10 mol %, or about 15 mol % to a high of about 45 mol %, about 55 mol %, or about 60 mol %. The argon concentration in the hydrogen-lean recycle gas in line 163 can range from a low of about 1 mol %, about 5 mol %, or about 10 mol % to a high of about 15 mol %, about 18 mol %, or about 20 mol %. As used herein, the term "hydrogen-rich recycle gas" refers to a recycle gas containing more hydrogen than the hydrogen-lean recycle gas.

Nitrogen, hydrogen, and/or methane recovered from the purge gas recovery unit and recycled via line 163 to the hydrocarbon in line 101 and/or via line 165 to the effluent in line 115 can increase the overall production of an ammonia product recovered via line 154 from the ammonia synthesis unit 150. In at least one example, the purge gas via line 152 can be recycled to the hydrocarbon in line 101, the effluent in line 115, and/or the fuel in line 105. During increased ambient temperatures, e.g., summer months, the amount of nitrogen available in the air, which can be introduced to the system 100 as an oxidant, e.g., air or an oxygen-rich gas via line 118 is reduced as compared to times of reduced ambient temperatures, e.g., winter. A reduction in the amount of nitrogen introduced to the system 100 with the oxidant in line 118 can directly impact the amount of ammonia that can be produced in the ammonia synthesis unit 150. Accordingly, recycling at least a portion of any nitrogen, hydrogen, and/or methane in the purge gas in line 152 can increase the amount of the ammonia product via line 154.

Introducing the recycle gas via lines 163 and/or 165 to the hydrocarbon in line 101 and/or the effluent in line 115, respectively, can increase the ammonia product recovered via line 154 during increased ambient temperatures, e.g., greater than about 27° C., by an amount ranging from a low of about 0.5%, about 0.8%, or about 1% to a high of about 4%, about 6%, or about 8% as compared to operating the system 100 during reduced ambient temperatures, e.g., less than about 27° C. and/or without recycling any of the recycle gas in line 163. For example, introducing the recycle gas via lines 163 and/or 165 to the hydrocarbon in line 101 and/or the effluent in line 115, respectively, can increase the amount of ammonia recovered via line 154 by about 2% to about 4% or about 1.5% to about 4.%, or about 2.5% to about 3.5% as compared to operating the system 100 during reduced ambient temperatures, e.g., less than about 27° C., and/or without recycling any of the recycle gas in line 163.

Introducing the recycle gas via line 163 to the hydrocarbon in line 101 and/or via line 165 to the effluent in line 115 can also increase the amount of carbon dioxide and/or carbon monoxide contained in the effluent in line 115 and/or the syngas in line 123, respectively. As noted above, the recycle gas in line 163 can include methane and the methane can be at least partially reformed within the first reformer 110 and/or the second reformer 120 to produce carbon dioxide, carbon monoxide, and hydrogen. As such, the amount of hydrogen in the effluent in line 115 and/or the syngas in line 123 can also be increased by recycling at least a portion of the recycle gas via line 163 to the hydrocarbon in line 101 and/or via line 165 to the effluent in line 115.

Any portion of the recycle gas via line 163, 164 and/or 165 can be recycled to the hydrocarbon in line 101, the fuel in line 105 and/or the effluent in line 115 respectively. For example, the amount of the recycle gas via line 163 introduced to the hydrocarbon in line 101 can range from a low of about 5%, about 10%, about 15%, or about 20% to a high of about 35%, about 40%, about 45%, or about 50%, based on the total amount of recycle gas recovered via line 163 from the tail gas recovery unit 160. In another example, the amount of recycle gas via line 164 introduced to the fuel in line 105 can range from a low of about 20%, about 30%, or about 40% to a high of about 50%, about 70%, about 80%, about 90%, about 95%, or about 100%, based on the total amount of recycle gas produced by the tail gas recovery unit 160. In still another example, the amount of recycle gas via line 165 introduced to the effluent in line 115 can range from a low of about 5%, about 10%, about 15%, or about 20% to a high of about 35%, about 40%, about 45%, or about 50%, based on the total amount of recycle gas produced by the tail gas recovery unit 160. In at least one specific embodiment, the amount of recycle gas in line 163 recycled to the hydrocarbon in line 101 can range from about 30% to about 50% and the amount of recycle gas in line 163 introduced via line 164 to the fuel in line 105 can range from about 50% to about 70%. In at least one other specific embodiment, the amount of recycle gas in line 163 recycled to the hydrocarbon in line 101 can range from about 20% to about 40% and the amount of recycle gas in line 163 introduced via line 164 to the fuel in line 105 can range from about 60% to about 80%.

Introducing at least a portion of the recycle gas via line 164 to the fuel in line 105 can also reduce and/or prevent the concentration of argon from increasing above a predetermined level or amount in the system 100. For example, introducing from about 50% to about 80% of the recycle gas via line 164 to the fuel in line 105 can maintain the argon concentration in the effluent in line 115 and/or the syngas in line 123 at less than about 10 mol %, less than about 5 mol %, less than about 2 mol %, or less than about 1 mol %. In another example, removing about 50% to about 80% of the recycle gas in line 163 from the system 100, e.g., by venting to the atmosphere, used fuel in another combustion process, or otherwise disposed of, can maintain the argon concentration in the effluent in line 115 and/or the syngas in line 123 at less than about 10 mol %, less than about 5 mol %, less than about 2 mol %, or less than about 1 mol %. In another example, a portion of the recycle gas in line 163 can be recycled via line 163 to the hydrocarbon in line 101 and/or via line 165 to the effluent in line 115, and a portion of the recycle gas in line 163 can be introduced via line 164 to the fuel in line 105 and a portion can be vented to the atmosphere or otherwise removed from the system 100.

In one or more embodiments, the purge gas recovery unit 160 can optionally include an argon separation unit, which can reduce the amount of argon in the recycle gas in line 163. For example, a purge gas recovery unit 160 that includes an argon separation unit can produce an argon-lean recycle gas via line 163 and an argon-rich gas via line 162. The argon-lean recycle gas in line 163 can contain less than about 5 mol % argon, less than about 3 mol %, less than about 2 mol %, less than about 1 mol % argon, less than about 0.5 mol %, or less than about 0.1 mol % argon.

For a system 100 that includes the optional argon separation unit in the purge gas recovery unit 160, any portion of the argon-lean recycle gas in line 163 can be recycled via lines 163, 164, and/or 165 to the hydrocarbon in line 101, the fuel in line 105, the effluent in line 115, respectively. In other words, the amount of the recycle gas in line 163 recycled via lines 163, 164, and/or 165 to the hydrocarbon in line 101, the fuel in line 105 and/or the effluent in line 115, respectively, can range anywhere from a low of about 10%, about 20%, or about 30% to a high of about 40%, about 50%, about 60%, about 70%, about 80%, about 90%, or about 100%.

The hydrocarbon in line 101 can be or include one or more liquid or gaseous hydrocarbons, mixtures thereof, or any combination thereof. The hydrocarbon in line 101 can include any one or more $C_1$ to $C_{12}$ hydrocarbons, hydrogen, or any combination thereof. For example, the hydrocarbon in line 101 can include methane, ethane, propane, butane, pentane, hexane, hydrogen, or any combination thereof. The methane concentration in the hydrocarbon in line 101 can range from a low of about 30 mol %, about 50 mol %, or about 75 mol % to a high of about 95 mol %, about 99 mol %, or about 99.9 mol % with the balance including $C_2$, $C_3$, and heavier hydrocarbons. For example, the hydrocarbon in line 101 can have a methane concentration of about 55 mol % or more, about 60 mol % or more, about 65 mol % or more, about 70 mol % or more, about 75 mol % or more, about 80 mol % or more, about 85 mol % or more, or about 90 mol % or more. The hydrogen concentration in the hydrocarbon in line 101 can range from a low of about 0.1 mol %, about 1 mol %, or about 5 mol % to a high of about 20 mol %, about 30 mol %, or about 35 mol %. For example, the hydrocarbon in line 101 can have a hydrogen concentration of about 30 mol % or less, about 25 mol % or less, about 20 mol % or less, about 15 mol % or less, about 10 mol % or less, about 5 mol % or less, or about 1 mol % or less.

The pressure of the hydrocarbon in line 101 can range from a low of about 700 kPa, about 1,000 kPa, or about 1,400 kPa to a high of about 4,000 kPa, about 5,000 kPa, or about 6,000 kPa. The hydrocarbon in line 101 can have a heating value ranging from a low of about 30,000 $kJ/m^3$, about 35,000 $kJ/m^3$, or about 40,000 $kJ/m^3$ to a high of about 50,000 $kJ/m^3$, about 55,000 $kJ/m^3$, or about 60,000 $kJ/m^3$. For example, the hydrocarbon in line 101 can have a heating value of about 33,000 $kJ/m^3$, about 36,000 $kJ/m^3$, or about 39,000 $kJ/m^3$.

The steam via line 104 can be introduced to the hydrocarbon, as shown. In another example, the steam via line 104 can be introduced to the first reformer 110 separately (not shown). The pressure of the steam in line 103 can range from a low of about 700 kPa, about 1,000 kPa, or about 1,400 kPa to a high of about 4,000 kPa, about 4,750 kPa, or about 5,500 kPa.

The hydrocarbon via line 101 and the steam via line 104 can be introduced to the first reformer 110 at a steam-to-carbon molar ratio (or steam-to-carbon content of the hydrocarbon) ranging from a low of about 2.6, about 2.7, about 2.8, or about 2.9 to a high of about 3.1, about 3.2, about 3.4, about 3.5, about 3.6, about 3.7, about 3.8, about 3.9, or about 4. For example, the hydrocarbon via line 101 and the steam via line 104 can be introduced to the first reformer 110 at a steam-to-carbon molar ratio of about 2.6 to about 4, about 2.8 to about 3.8, about 3 to about 4, or about 2.9 to about 3.9.

As discussed above, the effluent in line 115 can include, but is not limited to, a portion of the hydrocarbon, hydrogen, carbon monoxide, carbon dioxide, steam, or any combination thereof. The effluent in line 115 can have a concentration of the hydrocarbon, i.e. non-reformed hydrocarbon from line

101, ranging from a low of about 3 mol %, about 5 mol %, or about 8 mol % to a high of about 30 mol %, about 35 mol %, or about 40 mol %. The effluent in line 115 can have a hydrogen concentration ranging from a low of about 5 mol %, about 10 mol %, about 15 mol %, or about 20 mol % to a high of about 55 mol %, about 60 mol %, about 65 mol %, or about 70 mol %. The effluent in line 115 can have a methane concentration ranging from a low of about 10 mol %, about 20 mol %, about 30 mol %, about 35 mol %, or about 40 mol % to a high of about 45 mol %, about 55 mol %, about 60 mol %, or about 65 mol %. The effluent in line 115 can have a carbon monoxide concentration ranging from a low of about 0.5 mol %, about 1 mol %, or about 2 mol % to a high of about 3 mol %, about 4 mol %, or about 5 mol %. The effluent in line 115 can have a carbon dioxide concentration ranging from a low of about 5 mol %, about 7%, or about 9 mol % to a high of about 12 mol %, about 15 mol %, or about 17 mol %.

In at least specific embodiment, the effluent in line 115 can have a hydrogen concentration of from about 60 mol % to about 65 mol %, a methane concentration of from about 10 mol % to about 15 mol %, a carbon monoxide concentration of from about 5 mol % to about 10 mol %, a carbon dioxide concentration of from about 5 mol % to about 15 mol %, and a concentration of the hydrocarbon ranging from about 15 mol % to about 40 mol %, with other components such as $C_2$ and heavier hydrocarbons being absent or minimally present, for example at less than about 1 mol %, less than about 0.5 mol %, less than about 0.4 mol %, less than about 0.3 mol %, or less than about 0.1 mol %.

The effluent in line 115 can have a temperature ranging from a low of about 550° C., about 650° C., about 700° C., or about 750° C. to a high of about 800° C., about 850° C., or about 900° C. For example, the effluent in line 115 can have a temperature of from about 590° C. to about 640° C., about 590° C. to about 630° C., about 590° C. to about 620° C., or about 590° C. to about 610° C. The pressure of the effluent in line 115 can range from a low of about 700 kPa, about 1,000 kPa, or about 1,400 kPa to a high of about 4,000 kPa, about 5,000 kPa, or about 6,000 kPa.

As discussed above, the effluent in line 115 can be reformed within the second reformer 120 to produce the syngas via line 123 that can include, but is not limited to, hydrogen, carbon monoxide, carbon dioxide, steam, nitrogen, argon, or any combination thereof. The syngas in line 123 can have a hydrogen concentration ranging from about 35 mol % to about 80 mol % or about 50 mol % to about 80 mol %. For example, the syngas in line 123 can have a hydrogen concentration ranging from a low of about 35 mol %, about 40 mol %, about 43 mol %, or about 45 mol % to a high of about 53 mol %, about 55 mol %, about 60 mol %, or about 65 mol %. The syngas in line 123 can have a methane concentration of less than about 10 mol %, less than about 8 mol %, less than about 6 mol %, less than about 4 mol %, less than about 2 mol %, less than about 1 mol %, less than about 0.5 mol %, less than about 0.3 mol %, or less than about 0.1 mol %. For example, the methane concentration of the syngas can range from about 0.1 mol % to about 0.5 mol %, about 0.1 mol % to about 4 mol %, about 0.3 mol % to about 1 mol %, or about 0.6 mol % to about 1.6 mol %. The syngas in line 123 can have a carbon monoxide concentration ranging from a low of about 5 mol %, about 7 mol %, about 9 mol %, or about 11 mol % to a high of about 13 mol %, about 15 mol %, about 17 mol %, or about 20 mol %. The syngas in line 123 can have a carbon dioxide concentration ranging from a low of about 5 mol %, about 7 mol %, about 9 mol %, or about 11 mol % to a high of about 13 mol %, about 15 mol %, about 17 mol %, or about 20 mol %. The syngas in line 123 can have a nitrogen concentration ranging from a low of about 10 mol %, about 20 mol %, or about 30 mol % to a high of about 35 mol %, about 37 mol %, or about 40 mol %. The syngas in line 123 can have an argon concentration of less than about 5 mol %, less than about 4 mol %, less than about 3 mol %, less than about 2 mol %, less than about 1 mol %, or less than about 0.5 mol %. In at least one specific embodiment, the syngas in line 123 can have a hydrogen concentration of from about 50 mol % to about 80 mol %, a carbon monoxide concentration of from about 5 mol % to about 20 mol %, a carbon dioxide concentration of from about 5 mol % to abut 20 mol %, a nitrogen concentration of about 20 mol % to about 40 mol %, an argon concentration of less than about 2 mol %, and a methane concentration of from about 0.1 mol % to about 4 mol %.

The syngas in line 123 can have a temperature ranging from a low of about 950° C., about 975° C., or about 1,000° C. to a high of about 1,050° C., about 1,075° C., or about 1,100° C. The pressure of the syngas in line 123 can range from a low of about 700 kPa, about 1,000 kPa, or about 1,400 kPa to a high of about 4,000 kPa, about 5,000 kPa, or about 6,000 kPa.

The first reformer 110 can be or include any type of hydrocarbon reformer or reformer system. As illustrated in FIG. 1, the first reformer 110 can be a steam-methane reformer ("SMR") that can include a combination of radiant and/or convective reformers. The first reformer 110 can be or include top-fired furnaces, side-fired furnaces, terrace wall reformers, bottom fired reformer furnaces, or the like. The first reaction zone within the first reformer 110 can be or include a plurality of radiantly heated, single walled, catalyst-containing tubes. The first reformer 110 can include about 25 or more tubes, about 50 or more tubes, about 75 or more tubes, about 100 or more tubes, about 200 or more tubes, about 400 or more tubes, about 500 or more tubes, about 600 or more tubes, about 700 or more tubes, about 800 or more tubes, about 900 or more tubes, or about 1,000 or more tubes. The tubes 111 can have an inside diameter ranging from a low of about 40 mm, about 50 mm, or about 65 mm to a high of about 90 mm, about 100 mm, about 125 mm, about 150 mm, about 200 mm or more. For example, the inner diameter of one or more tubes can be about 125 mm, about 150 mm, or about 175 mm. The diameter of the one or more tubes 111 can reduce or minimize the radial temperature gradient of the tubes. The first reformer 110 can also include one or more convective sections, e.g., an exhaust duct (not shown), that can be used to heat one or more feeds such as the hydrocarbon in line 101, the oxidant in line 118, and the like. The one or more convective sections can use heat generated from the radiant section as a heating source. The first reformer 110 can operate at a temperature of from about 500° C. to about 1,100° C., for example from about 500° C. to about 1,000° C., and can have a heat output of from about 300 MMBTU/hr to about 350 MMBtu/hr, for a 1500 t/d ammonia plant.

The fuel via line 105 combusted to generate heat within the first reformer 110 can include any gaseous, liquid, solid, or multi-phase fuel source. The fuel via line 105 can include, but is not limited to, hydrogen, $C_1$ to $C_{40}$ hydrocarbons, or any combination thereof. For example, methane, ethane, propane, natural gas, synthetic natural gas, or any combination thereof, can be used as the fuel via line 105.

The fuel combusted to generate the heat within the first reformer 110 can include low grade fuel sources in addition to or in lieu of fresh natural gas or other high quality hydrocarbon feeds. Suitable low grade fuel sources can include, but are not limited to, biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. Other suitable low grade fuel sources can include off-gases produced from the gasification of biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. The hydrocarbon-based polymeric materials can include, but are not limited to, thermoplastics, elastomers, rubbers, polypropylenes, polyethylenes, polystyrenes, other polyolefins, homopolymers, co-polymers, block co-polymers, polyethylene terephthalate, poly blends, or any combination thereof.

Use of a low grade fuel can reduce the demand and requirements for a high grade and/or fresh hydrocarbon that can be converted to the syngas in line 123 via the first and second reformers 110, 120. Use of low grade fuel can provide substantial cost reductions, increased flexibility in the operation of the system 100, and/or allow for an increase in the amount of syngas produced from the system 100, while still only requiring the same amount of hydrocarbon via line 101 to produce the syngas via line 123. For example, existing plants require a portion of the hydrocarbon in line 101 to heat the first reformer 110, which generates heat rather than syngas via line 123. The first reformer 110 can be adapted or modified or constructed to operate on the lower grade fuel, thereby allowing as much of the high grade hydrocarbon in line 101 as possible to be converted to the syngas in line 123.

The second reformer 120 can be or include any type of hydrocarbon reformer or reformer system. For example, as illustrated in FIG. 1, the second reformer 120 can be an autothermal reformer ("ATR"). The second catalyst 122 can include a single type of catalyst or a mixture of different types of catalyst. The second catalyst 122 can be disposed within the second reformer 120 in any desirable manner, e.g., one or more fixed catalyst beds, one or more fluidized catalyst beds, or the like, and combinations thereof. The one or more oxidants via line 118 can be introduced to a burner within the ATR, which can combust a portion of the effluent introduced via line 115 to provide heat that can be used to further endothermically reform at least a portion of the first effluent within the second reaction zone 121. Illustrative autothermal reformers can be similar to those discussed and described in U.S. Pat. Nos. 5,011,625; 5,122,299; 7,220,505; and 7,550,215, which are incorporated by reference herein. Other suitable types of reformers can include, but are not limited to reforming exchangers or heat reforming exchange reactors, partial oxidation reactors ("PDX"), catalytic partial oxidation reactors ("CPDX"), and the like.

Referring again to the syngas in line 123, the syngas can be further processed to provide or produce the ammonia product via line 154. The syngas via line 123 can be introduced to the one or more purification units 130 to provide or produce a purified syngas via line 132. The purification unit 130 can purify the syngas introduced via line 123 such that the syngas comprises primarily hydrogen and nitrogen with lesser amounts of methane, argon, carbon monoxide, and/or carbon dioxide. The purification unit 130 can include one or more shift converters to convert at least a portion of any carbon monoxide to carbon dioxide, one or more carbon dioxide removal systems or separators to separate a remove a carbon dioxide purge gas via line 134 from the syngas, one or more driers to remove at least a portion of any water via line 136, one or more methanators to convert at least a portion of any carbon monoxide and/or carbon dioxide to methane, or any combination thereof.

The purification unit 130 can adjust the hydrogen to carbon monoxide ratio ("$H_2:CO$") of the syngas by converting carbon monoxide to carbon dioxide. Within the shift converter, a water-gas shift reaction can react at least a portion of any carbon monoxide in the syngas introduced via line 123 with water in the presence of a catalyst and/or high temperature to produce hydrogen and carbon dioxide. The shift converter can include, but is not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. For example, a sorption enhanced water-gas shift ("SEWGS") process, utilizing a pressure swing adsorption unit having multiple fixed bed reactors packed with shift catalyst and high temperature (around 475° C.) carbon dioxide adsorbent, can be used.

The purification unit 130 can include two or more shift converters arranged in series and/or parallel. The purification unit 130 can include one or more high temperature shift converters (HTSCs), one or more medium temperature shift converters ("MTSC"), one or more low temperature shift converters ("LTSC"), or any combination thereof. At least a portion of the syngas via line 123 can be introduced to one or more HTSCs, MTSCs, and/or LTSCs in any order and/or combination.

The shift converted syngas can contain less carbon monoxide than the syngas in line 123. The shift converted syngas can contain about 5 mol % or less dry basis carbon monoxide, about 3 mol % or less dry basis carbon monoxide, about 2 mol % dry basis or less carbon monoxide, about 1 mol % or less dry basis carbon monoxide, or about 0.5 mol % dry basis or less dry basis carbon monoxide.

If the purification unit 130 includes a plurality of shift converters, the syngas via line 123 can be apportioned equally or unequally to the shift converters. For example, about 75 vol % of the cooled syngas via line 156 can be introduced to a HTSC and about 25% can be introduced to a MTSC.

The shift converters can contain one or more catalysts that can convert carbon monoxide in the syngas in line 123 to carbon dioxide by reacting the carbon monoxide in the presence of one or more catalysts at a temperature sufficient to oxidize the carbon monoxide. The catalyst within the one or more HTSCs can include, but is not limited to, iron oxide, zinc ferrite, magnetite, chromium oxides, derivatives thereof, or any combination thereof. The one or more HTSCs can be operated at a temperature of from about 325° C. to about 550° C., or from about 380° C. to about 450° C. The catalyst within the one or more MTSCs can include, but is not limited to, iron oxide, chromium oxide, derivatives thereof, or any combination thereof. The one or more MTSCs can be operated at a temperature of from about 250° C. to about 300° C. The catalyst within the one or more LTSCs can include, but is not limited to, copper, zinc, copper promoted chromia, derivatives thereof, or any combination thereof. The one or more LTSC can be operated at a temperature from about 180° C. to about 220° C.

The one or more carbon dioxide removal systems can selectively separate carbon dioxide from the syngas in line 123 and/or the shift converted syngas to produce a carbon dioxide lean syngas and/or carbon dioxide. The carbon dioxide can be recovered via line 134. The carbon dioxide removal system can include any one or a combination of physical, mechanical, electrical and/or chemical systems configured in series, parallel, or any combination thereof. The carbon dioxide removal system can include one or more physical separation systems including, but not limited to, membrane type systems and solvent based systems. For example, the carbon dioxide removal system can include, but is not limited to, absorbtion/desorption type, solvent-based systems. The carbon dioxide removal system can contact the syngas introduced thereto with one or more absorbents to remove at least a portion of the carbon dioxide. Carbon dioxide selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (SELEXOL® process), n-methyl-pyrrolidone, sulfolane, and use of the Sulfinol Gas Treatment Process.

The carbon dioxide lean syngas can be introduced to the one or more methanators within the purification unit 130 to convert at least a portion of any carbon monoxide and/or carbon dioxide to methane and water. For example, the methanator can convert most, e.g. greater than about 50%, of the carbon monoxide and/or carbon dioxide to methane and water. The methanator can provide a syngas having a total carbon monoxide and carbon dioxide concentration of less than about 500 ppm, less than about 200 ppm, less than about 100 ppm, less than about 50 ppm, 20 ppm, or less than about 15 ppm, or about 5 ppm, or less than about 2 ppm.

The one or more methanators can include any one or a combination of physical, mechanical, electrical and/or chemical systems to convert carbon monoxide and carbon dioxide to methane, configured either in series, parallel, or any combination thereof. The one or more methanators can be a catalytic process operating at a temperature sufficient for converting or reacting at least a portion of any carbon monoxide and/or carbon dioxide to methane and water. The one or more catalytic process can include one or more catalytic reactors arranged in series or parallel, containing one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator can operate at a temperature of from about 200° C. to about 400° C.

The syngas lean in carbon monoxide and/or carbon dioxide can also be introduced to the one or more optional driers within the purification unit 130 to provide a syngas having a reduced amount of water. The drier can remove or separate at least a portion of any water in the carbon monoxide and carbon dioxide lean syngas to provide a dried syngas. In another example, the drier can remove or separate most, e.g. greater than about 50%, of the water from the carbon monoxide and carbon dioxide lean syngas. The separated water via line 136 can be recovered from the purification unit 130.

The drier can include, but is not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The purified syngas via line 132 can have a hydrogen concentration ranging from a low of about 40 mol %, about 50 mol %, or about 55 mol % to a high of about 75 mol %, about 80 mol %, or about 85 mol %. The purified syngas in line 132 can have a nitrogen concentration ranging from a low of about 10 mol %, about 20 mol %, or about 25 mol % to a high of about 40 mol %, about 45 mol %, or about 50 mol %. The purified syngas in line 132 can have a carbon dioxide concentration of less than about 3 mol %, less than about 2 mol %, less than about 1 mol %, or less than about 0.5 mol %. The purified syngas in line 132 can have a carbon monoxide concentration of less than about 3 mol %, less than about 2 mol %, less than about 1 mol %, or less than about 0.5 mol %. The purified syngas in line 132 can have a methane concentration of less than about 3 mol %, less than about 2 mol %, less than about 1 mol %, or less than about 0.5 mol %. The purified syngas in line 132 can have an argon concentration ranging from a low of about 0.1 mol %, about 0.5 mol %, or about 0.75 mol % to a high of about 1 mol %, about 1.5 mol %, or about 2 mol %.

The purified syngas in line 132 can have a hydrogen to nitrogen ($H_2:N_2$) molar ratio ranging from about 1.5:1 to about 5:1, from about 2:1 to about 4:1, or from about 2.2:1 to about 3.2:1. In another example, the purified syngas in line 132 can have a $H_2:N_2$ molar ratio of about 2.8:1, about 2.9:1, about 3:1, about 3.1:1, or about 3.2:1.

Illustrative purification systems 130 can include the shift converters, driers, methanators, separators, and other purification components discussed and described in U.S. Pat. Nos. 7,138,001 and 7,550,215; and U.S. Patent Application Publication Nos. 2008/0275143, 2009/0064582, and 2010/0132259, which are incorporated by reference herein.

The purified syngas via line 132 can be introduced to the one or more compressors 140 to provide a compressed syngas via line 142. The pressure of the compressed syngas in line 142 can range from about 6,000 kPa, about 8,000 kPa, or about 10,000 kPa to a high of about 17,000 kPa, about 20,000 kPa, or about 25,000 kPa. The compressor 140 can be any suitable type of compressor or combination of compressors. Illustrative compressors can include, but are not limited to, axial, centrifugal, rotary positive displacement, and the like. The compressor 140 can be a single stage compressor, a dual stage compressor, or the like.

The compressed syngas via line 142 can be introduced to the ammonia synthesis unit 150 to provide or produce the ammonia product via line 154 and the purge gas via line 152. The ammonia synthesis unit 150 can include one or more ammonia converters and one or more ammonia condensers (not shown). At least a portion of the nitrogen and hydrogen present in the compressed syngas can combine to provide an ammonia converter product (not shown). The ammonia converter product can have an ammonia concentration ranging from a low of about 5 mol %, about 10 mol %, or about 15 mol % to a high of about 25 mol %, or about 30 mol %. For example, the ammonia concentration of the ammonia converter product can range from a low of about 12 mol %, about 14 mol %, or about 16 mol % to a high of about 22 mol %, about 24 mol %, or about 26 mol %. The hydrogen concentration of the ammonia converter product can range from a low of about 50 mol %, about 55 mol %, or about 60 mol % to a high of about 70 mol %, about 75 mol %, or abut 80 mol %. The nitrogen concentration of the ammonia converter product can range from a low of about 15 mol %, about 20 mol %, or about 25 mol % to a high of about 30 mol %, about 35 mol %, about 40 mol %, or more than abut 40 mol %.

The one or more ammonia converters can be conventional single or multi-pass converters using one or more magnetite catalysts. The one or more ammonia converters can be single or multi-pass converters using one or more noble metal catalysts, or one or more catalysts based upon ruthenium, such as the ruthenium-based KAAP catalyst available from Kellogg Brown and Root LLC.

The one or more ammonia converters can include any reactor intended to operate at elevated pressures and/or temperatures to convert at least a portion of a feed gas containing nitrogen and hydrogen, e.g. the compressed syngas in line 142, to ammonia. The one or more ammonia converters can be or include one or more "Split-Flow Ammonia Converters," as discussed and described in U.S. Pat. No. 7,081,230, which is incorporated by reference herein. The one or more ammonia converters can be or include one or more "Isothermal Ammonia Converters," as discussed and described in U.S. Pat. No. 6,171,570, which is incorporated by reference herein. The one or more ammonia converters can be or include one or more "Horizontal Ammonia Converter Adapted for High Activity Catalyst," as discussed and described in U.S. Pat. No. 6,132,687, which is incorporated by reference herein. The one or more ammonia converts can be or include one or more ammonia converters as discussed and described in U.S. Patent Application Publication No.: 2009/0136391, which is incorporated by reference herein.

The ammonia converter product can be introduced to the one or more ammonia condensers. The one or more ammonia condensers can condense and separate the ammonia to provide the ammonia product via line 154 and the purge gas via line 152. The ammonia product via line 154 can contain, but is not limited to, ammonia, hydrogen, and nitrogen. The ammonia product in line 154 can contain a minimum of about 95 percent by weight ("wt %"), a minimum of about 98 wt %, a minimum of about 99 wt %, or a minimum of 99.9 wt % ammonia. The ammonia product via line 154 can contain a maximum of about 5 wt %, about 2 wt %, about 1 wt %, about 0.5 wt %, or about 0.1 wt % hydrogen and nitrogen.

The one or more ammonia condensers can include any mechanical or chemical system capable of selectively separating ammonia from a gas mixture including at least hydrogen and nitrogen. The one or more ammonia condensers can include one or more cryogenic purifiers containing one or more refrigeration exchangers and one or more refrigeration compressors.

The purge gas in line 152 can have a hydrogen concentration ranging from a low of about 35 mol %, about 40 mol %, or about 45 mol % to a high of about 60 mol %, about 65 mol %, or about 70 mol %. The purge gas in line 152 can have a methane concentration ranging from a low of about 2 mol %, about 4 mol %, or about 6 mol % to a high of about 15 mol %, about 17 mol %, or about 20 mol %. The purge gas in line 152 can have a nitrogen concentration ranging from a low of about 18 mol % or about 20 mol % to a high of about 23 mol % or about 25 mol %. The purge gas in line 152 can have an argon concentration ranging from a low of about 2 mol %, about 3 mol %, or about 4 mol % to a high of about 5 mol %, or about 6 mol %.

As mentioned above, the purge gas via line 152 can be introduced to the purge gas recovery unit 160 to produce the hydrogen via line 161 and the recycle gas via line 163. All or a portion of the hydrogen via line 161 can be recycled to the syngas in line 132 prior the compressor 140, as shown, or to the compressed syngas in line 142 (not shown). In another example, the hydrogen in line 161 can be recycled to the syngas in line 123.

FIG. 2 depicts an illustrative system 200 for producing syngas and ammonia therefrom, according to one or more embodiments. The system 200 can include one or more first reformers 210 and one or more second reformers 220. The first reformer 210 can be an autothermal reformer (ATR) and the second reformer 220 can be a reforming exchanger. The system 200 can also include the one or more purification units 130, compressors 140, ammonia synthesis units 150, and purge gas recovery units 160 more, which can be as discussed and described above with reference to FIG. 1. The first reformer 210 can be similar to the second reformer 120, discussed and described above with reference to FIG. 1.

The hydrocarbon via line 101 and oxidant or an oxidant/steam mixture via line 118, which can be as discussed and described above with reference to FIG. 1, can be introduced to the first reformer 210 to produce a first reformed hydrocarbon or first effluent via line 215. The oxidant or oxidant/steam mixture via line 118 can be introduced to a burner within the ATR, which can combust a portion of the hydrocarbon introduced via line 101 to provide heat that can be used to endothermically reform at least a portion of the hydrocarbon in the presence of a first catalyst 212 disposed within one or more catalyst beds 211. The catalyst bed 211 can include a single type of catalyst or a mixture of different types of catalyst.

The first effluent in line 215 can have a hydrogen concentration ranging from a low of about 10 mol %, about 20 mol %, or about 20 mol % to a high of about 65 mol %, about 70 mol %, about 75 mol %, or about 80 mol %. The first effluent in line 215 can have a carbon monoxide concentration ranging from a low of about 5 mol %, about 7 mol %, or about 9 mol % to a high of about 11 mol %, about 13 mol %, or about 15 mol %. The first effluent in line 215 can have a carbon dioxide concentration ranging from a low of about 5 mol %, about 7 mol %, or about 9 mol % to a high of about 13 mol %, about 18 mol %, or about 20 mol %. The first effluent in line 215 can have a nitrogen concentration ranging from a low of about 5 mol %, about 10 mol %, or about 15 mol % to a high of about 30 mol %, about 35 mol %, or about 40 mol %. The first effluent in line 215 can have a methane concentration of less than about 10 mol %, about 8 mol %, about 6 mol %, about 4 mol %, about 2 mol %, less than about 1.8 mol %, less than about 1.5 mol %, less than about 1 mol %, less than about 0.5 mol %, or less than about 0.3 mol %. For example, the methane concentration of the first effluent in line 215 can range from about 0.5 mol % to about 1 mol % or from about 0.6 mol % to about 1.6 mol %. In at least one specific embodiment, the first effluent in line 215 can have a hydrogen concentration of from about 50 mol % to about 60 mol %, a carbon monoxide concentration of from about 10 mol % to about 15 mol %, a carbon dioxide concentration of from about 10 mol % to about 15 mol %, a nitrogen concentration of about 25 mol % to about 30 mol %, and a methane concentration of less than about 1 mol %.

The first effluent in line 215 can have a temperature ranging from a low of about 900° C., about 950° C., or about 1,000° C. to a high of about 1,050° C., about 1,075° C., or about 1,100° C. The pressure of the first effluent in line 215 can range from a low of about 700 kPa, about 1,000 kPa, or about 1,400 kPa to a high of about 4,000 kPa, about 5,000 kPa, or about 6,000 kPa.

A second hydrocarbon via line 201 can be introduced to the second reformer 220 to produce a second effluent. Steam in line 103 can be introduced via line 204 to the second hydrocarbon in line 201 to provide a second hydrocarbon/steam mixture. The second hydrocarbon in line 201 can be the same as or similar to the hydrocarbon in line 101. For example, the second hydrocarbon in line 201 can be or include one or more liquid or gaseous hydrocarbons, mixtures thereof, or any combination thereof. The second hydrocarbon in line 201 can include any one or more $C_1$ to $C_{12}$ hydrocarbons, hydrogen, or any combination thereof.

The second reformer 220 can be any type of reforming exchanger and are well known in the art. As illustrated, the reforming exchanger 220 can be a shell-and-tube type exchanger that includes one or more tubes 222 at least partially disposed within a shell-side 221 of the reforming exchanger 220. One or more second catalysts 223 can be disposed within the tubes 222 to provide one or more catalyst-containing tubes 222. The catalyst-containing tubes 222 can be arranged in any pattern or configuration within the shell-side 221 of the reforming exchanger 220. Although not shown, the catalyst-containing tubes 222 can include, but are not limited to, one or more fins, static mixers, rifling, heat conductive packing, turbulence causing projections, or any combination thereof, disposed on the external surface and/or the internal surface of the catalyst-containing tubes 222. The catalyst-containing tubes 222 can be of various types, for example, straight tubes, bayonet tubes (not shown), U-tubes (not shown), coiled tubes (not shown), or any combination thereof. The catalyst-containing tubes 222 can be disposed in vertical, horizontal, or at any other angle within the reforming exchanger 220. The second reformer 220 can be or include a KBR Reforming Exchanger System ("KRES"). Additional KRES structural designs, process conditions, catalysts, and other details can be found in U.S. Pat. Nos. 5,011,625; 5,122, 299; 5,362,454; 6,855,272; 7,138,001; and 7,220,505; and U.S. Patent Application Publication Nos. 2008/0275143 and 2009/0064582, which are incorporated by reference herein. Additional reforming exchanger types, catalyst types, process conditions, and other details can be found in U.S. Pat. Nos. 7,074,347 and 6,224,789, which are incorporated by reference herein.

The second hydrocarbon in line 201 can be reformed within the catalyst-containing tubes 222 to produce the second effluent or second reformed hydrocarbon via one or more exits or openings 224 from the catalyst-containing tubes 222. The second effluent via the openings 224 from the catalyst-containing tubes 222 can contain hydrogen, carbon monoxide, carbon dioxide, and other minor components, such as methane. The second effluent via the catalyst-containing tubes 222 can have a hydrogen concentration ranging from a low of about 45 mol %, about 50 mol %, about 55 mol %, about 60 mol %, about 65 mol %, about 67 mol %, or about 69 mol % to a high of about 75 mol %, about 77 mol %, or about 80 mol %. For example, the second effluent via the catalyst-containing tubes 222 can have a hydrogen concentration ranging from about 45 mol % to about 80 mol %, or about 55 mol % to about 80 mol %, or abut 60 mol % to about 80 mol %. The second effluent via the catalyst-containing tubes 222 can have a methane concentration less than about 10 mol %, less than about 8 mol %, less than about 5 mol %, less than about 3 mol %, less than about 2 mol %, less than about 0.5 mol %, or less than about 0.2 mol %. For example, the methane concentration of the second effluent can range from about 1 mol % to about 3 mol %, or about 0.1 mol % to about 4 mol %. The second effluent via the catalyst-containing tubes 222 can have a carbon monoxide concentration ranging from a low of about 5 mol %, about 5 mol %, about 10 mol %, or about 12 mol % to a high of about 15 mol %, about 16 mol %, or about 17 mol %. The second effluent via the catalyst-containing tubes 222 can have a carbon dioxide concentration ranging from a low of about 5 mol %, abut 6 mol %, or about 7 mol % to a high of about 8 mol %, about 9 mol %, or about 10 mol %. In at least one specific embodiment, the second effluent via the catalyst-containing tubes 222 can have a hydrogen concentration of from about 70 mol % to about 78 mol %, a carbon monoxide concentration of from about 12 mol % to about 16 mol %, a carbon dioxide concentration of from about 6 mol % to about 8 mol %, a methane concentration of less than about 2 mol %.

The first effluent via line 215 can be introduced to the shell-side 221 of the second reformer 220. The first effluent introduced via line 215 can be mixed with the second effluent within the shell-side 221 of the second reformer 220 to provide a mixed reformed hydrocarbon product or syngas. Although not shown, the second effluent and the first effluent can remain separated, i.e. independent from one another. For example, the first effluent can be maintained separate from the second effluent recovered via the catalyst-containing tubes 222 by a tube sheet, for example. Although not shown, the second effluent and the first effluent can be mixed with one another outside the second reformer 220.

Heat required for endothermic reforming reactions of the second hydrocarbon within the catalyst-containing tubes 222 can be provided from the first effluent. The first effluent introduced via line 215, either alone or mixed or otherwise combined with the second reformed hydrocarbon, can flow along the outside of the one or more catalyst-containing tubes 222, thereby indirectly transferring heat from the first effluent to the second hydrocarbon introduced via line 201 to the second reformer 220.

As shown in FIG. 2, the first effluent introduced via line 215 to the second reformer 220 and the second effluent provided via the opening 224 from the catalyst-containing tubes 222 can be mixed within the shell-side 221 of the second reformer 220 to provide a reformed product or syngas. The syngas can be recovered from the shell-side 221 of the second reformer via line 230. However, as mentioned above, depending on the particular design of the second reformer 220, the first effluent and the second effluent can remain independent of one another. In another example, the first effluent and the second effluent can be mixed outside the reforming exchanger 220.

The one or more second catalysts 223 disposed in the catalyst-containing tubes 222 of the second reformer 220 and the one or more first catalysts 212 disposed within the catalyst bed 221 of the first reformer 210 can be the same or different, with respect to one another. Suitable catalysts can include, but are not limited to, noble metals, cobalt, nickel, oxides thereof, derivatives therefore, or combinations thereof. The first and second catalysts 212, 223 can be supported by one or more support materials. The one or more support materials can include, but are not limited to, alumina, refractory alumina, magnesium aluminate, calcium aluminate, calcium aluminate titanate, zirconia, cerium modified zirconia, or any combination thereof. An illustrative catalyst including nickel can have a nickel concentration ranging from a low of about 5 wt %, about 10 wt %, or about 12 wt % to a high of about 15 wt %, about 20 wt %, or about 25 wt %. The catalysts can be prepared in any desired shape or form by a variety of methods, for example, briquetting, tabletting, etc. The shape of the catalyst can be in the form of extruded, briquetted or tabletted cylinders, polylobal extrusions, spheres, rings, hollow core cylinders, solid cylinders, hollow core cylinders with grooves on the inside and/or outside surfaces, or any other appropriate geometric shape.

The syngas via line 230 can be at a temperature ranging from a low of about 650° C., about 660° C., or about 670° C. to a high of about 775° C., about 800° C., or about 825° C. The syngas in line 230 can have a hydrogen concentration ranging from about 35 mol % to about 80 mol % or 50 mol % to about 80 mol %. For example, the syngas in line 123 can have a hydrogen concentration ranging from a low of about 35 mol %, about 40 mol %, about 43 mol %, or about 45 mol % to a high of about 53 mol %, about 55 mol %, about 60 mol %, or about 65 mol %. The syngas in line 230 can have a carbon monoxide concentration ranging from a low of about 5 mol %, about 7 mol %, or about 9 mol % to a high of about 15 mol %, about 18 mol %, or about 20 mol %. The syngas in line 230 can have a carbon dioxide concentration ranging from a low of about 5 mol %, about 7 mol %, or about 9 mol % to a high of about 15 mol %, about 18 mol %, or about 20 mol %. The syngas in line 230 can have a nitrogen concentration ranging from a low of about 20 mol %, about 25 mol %, or about 30 mol % to a high of about 35 mol %, about 40 mol %, about 45 mol %, or about 50 mol %. The syngas in line 230 can have a methane concentration of less than about 10 mol %, less than about 8 mol %, less than about 5 mol %, less than about 3 mol %, less than about 2 mol %, less than about 1 mol %, or less than about 0.5 mol %. For example, the methane concentration of the syngas in line 230 can range from about 0.3 mol % to about 2 mol % or from about 0.1 mol % to about 4 mol %.

The syngas via line 230 can be introduced to the purification unit 130 to produce the purified syngas via line 132. The purification unit 130 can also produce the carbon dioxide via line 134 and/or water via line 136, as discussed and described above with reference to FIG. 1. The purified syngas via line 132 can be introduced to the one or more compressors 140 to provide compressed purified syngas via line 142. The compressed syngas via line 142 can be introduced to and the ammonia synthesis unit 150 to provide an ammonia product via line 154 and a purge gas via line 152, as discussed and described above with reference to FIG. 1. The purge gas via line 152 can be introduced to the purge gas recovery unit 160 to produce the hydrogen recycle via line 161 and the recycle gas via line 163, and an optional argon purge gas via line 162, as discussed and described above with reference to FIG. 1. In another example, at least a portion of the purge gas via line 152 can be introduced to the first hydrocarbon in line 101, the second hydrocarbon in line 201, and/or the effluent in line 215.

The recycle gas via line 163 produced from the purge gas recovery unit 160 can also be recycled to any number of locations or combination of locations within the system 200, similar to the system 100. For example, the recycle gas via line 163 can be recycled to the hydrocarbon in line 101. In another example, the recycle gas in line 163 can be recycled via line 165 to the first effluent in line 215. In another example, the recycle gas in line 163 can be recycled via line 263 to the hydrocarbon in line 201. In other words, the recycle gas in line 163 can be recycled via line 163 to the hydrocarbon in line 101, recycled via line 263 to the hydrocarbon in line 201, recycled via line 165 to the first effluent in line 215, or any combination thereof. As such, the hydrocarbon in line 101, the hydrocarbon in line 201, the first effluent in line 215, and/or the syngas in line 230 can include at least a portion of the recycle gas in line 163 produced from the purge gas recovery unit 160.

The amount of the recycle gas via line 163 introduced to the hydrocarbon in line 101 can range from a low of about 5%, about 10%, about 15%, or about 20% to a high of about 35%, about 40%, about 45%, or about 50%, based on the total amount of recycle gas recovered via line 163 from the tail gas recovery unit 160. In another example, the amount of recycle gas via line 263 introduced to the second hydrocarbon in line 201 can range from a low of about 5%, about 10%, about 15%, or about 20% to a high of about 35%, about 40%, about 45%, or about 50%, based on the total amount of recycle gas recovered via line 163 from the tail gas recovery unit 160. In still another example, the amount of recycle gas via line 165 introduced to the effluent in line 215 can range from a low of about 5%, about 10%, about 15%, or about 20% to a high of about 35%, about 40%, about 45%, or about 50%, based on the total amount of recycle gas produced by the tail gas recovery unit 160.

In one or more embodiments, at least a portion of the syngas recovered via line 123 from the second reformer 120 and/or at least a portion of the syngas recovered via line 230 from the second reformer 220, as discussed and described above with reference to FIGS. 1 and 2, respectively, can be used in other processes as a fuel and/or a feed for producing one or more other products. Illustrative processes for which the syngas in lines 123 and/or 230 can be used can be similar to the processes discussed and described in U.S. Patent Application Publication Nos.: 2009/0064582 and 2008/0275143, which are incorporated by reference herein.

The system 100 and/or the system 200 can be built as a new or grass-roots facility. In other words, the system 100 and/or the system 200 can be built from the ground up. The system 100 and/or the system 200 can be provided by modifying, retrofitting, or revamping an existing syngas production system. For example, an existing syngas production system that includes a steam methane reformer and a secondary autothermal reformer, similar to the system 100 can be revamped to include the recycle line 163, which can introduce at least a portion of the recycle gas via line 163 to the hydrocarbon in line 101, via line 164 to the fuel in line 105, the effluent in line 115, and/or the syngas in line 132. Revamping an existing integrated syngas and ammonia system or constructing a new one to include the recycle line 163 can increase the production of ammonia during periods of high ambient temperatures that cause a reduction in the amount of nitrogen available from the air. Revamping an existing integrated syngas and ammonia system or constructing a new one to include the recycle line 162 can also increase the amount of the hydrocarbons in line 101, 201 that is ultimately converted into ammonia rather than being used as a fuel source, vented to the atmosphere, or other use.

A revamped existing facility or a new facility that includes the recycle line 163, according to one or more embodiments discussed and described above or elsewhere herein, can increase the syngas production via lines 123 and/or 230 in an amount ranging from a low of about 1%, about 2%, or about 3% to a high of about 4%, about 5%, or about 6%, as compared to a facility not having the recycle line 163. Any syngas production system can be revamped or built to include the recycle line 163. For example, an existing facility that includes a single reformer, e.g. the first reformer 110, the second reformer 120, the first reformer 210, or the second reformer 220 can be revamped to include the recycle line 163 which can recycle at least a portion of the recycle gas to the hydrocarbon introduced to the system. In another example, any syngas production system that includes two reformers, e.g., the first reformer 110 and the second reformer 120, can be revamped to include the recycle line 163 as discussed and described above with reference to FIG. 1. In still another example, any syngas production system that includes three or more reformers, e.g., the first reformer 110, the second reformer 120, and third reformer such as a reforming exchanger 220 can be revamped or built new to include the recycle line 163.

Embodiments of the present disclosure further relate to any one or more of the following paragraphs:

1. A method for producing ammonia, comprising: reforming a hydrocarbon in a first reaction zone in the presence of one or more first catalysts and steam at conditions sufficient to produce an effluent comprising about 10 mol % to about 40 mol % of the hydrocarbon, about 5 mol % to about 20 mol % carbon monoxide, about 10 mol % to about 20 mol % carbon dioxide, and about 40 mol % to about 60 mol % hydrogen; reforming the effluent in a second reaction zone in the presence of one or more second catalysts and nitrogen at conditions sufficient to produce a syngas comprising about 10 mol % or less methane, about 40 mol % to about 60 mol % hydrogen, about 20 mol % to about 30 mol % nitrogen, about 5 mol % to about 15 mol % carbon monoxide, and about 10 mol % to about 20 mol % carbon dioxide; converting at least a portion of the nitrogen and hydrogen in the syngas to ammonia to produce an ammonia effluent; separating the ammonia effluent to produce an ammonia product and a purge gas comprising nitrogen; and recycling a first portion of the purge gas to the hydrocarbon, the effluent, or a combination thereof.

2. The method of paragraph 1, wherein the first reaction zone comprises one or more catalyst-containing tubes and the second reaction zone comprises one or more catalyst-containing beds.

3. The method according to paragraph 1 or 2, wherein reforming the effluent further comprises combusting a portion of the effluent in the presence of an oxidant to generate heat, wherein at least a portion of the heat is used to reform the effluent in the second reaction zone.

4. The method according to any of paragraphs 1 to 3, wherein reforming the first effluent further comprises combusting a fuel to generate heat, wherein at least a portion of the heat is indirectly transferred to the first reaction zone.

5. The method of paragraph 4, further comprising recycling a second portion of the purge gas to the fuel.

6. The method of paragraph 5, wherein the amount of the first portion of the purge gas recycled to the hydrocarbon comprises about 30% to about 50% of the total amount of the purge gas, and wherein the amount of the second portion of the purge gas recycled to the fuel comprises about 50% to about 70% of the total amount of the purge gas.

7. The method of according to any of paragraphs 1 to 6, further comprising: shift converting at least a portion of the carbon monoxide in the syngas to carbon dioxide to provide a shift converted syngas; and separating at least a portion of the carbon dioxide from the shift converted syngas to produce a carbon dioxide purge gas and a carbon dioxide-lean syngas prior to converting at least a portion of the nitrogen and hydrogen in the carbon dioxide-lean syngas to the ammonia effluent.

8. The method according to any of paragraphs 1 to 7, further comprising combusting at least a second portion of the purge gas to generate heat; and indirectly transferring at least a portion of the heat to the first reaction zone.

9. The method according to any of paragraphs 1 to 8, wherein the syngas comprises from about 50 mol % to about 80 mol % hydrogen, about 5 mol % to about 20 mol % carbon monoxide, about 5 mol % to about 20 mol % carbon dioxide, about 20 to about 40 mol % nitrogen, and about 0.1 mol % to about 4 mol % methane.

10. The method according to any of paragraphs 1 to 9, wherein reforming the effluent comprises combusting a first portion of the effluent in the presence of air to produce heat, wherein a second portion of the effluent is reformed in the second reaction zone in the presence of the heat and the one or more second catalysts.

11. The method according to any of paragraphs 1 to 10, wherein the hydrocarbon has a steam-to-carbon molar ratio ranging from about 2.7 to about 4.

12. The method according to any of paragraphs 1 to 11, further comprising separating the purge gas to produce a hydrogen-rich recycle gas and a hydrogen-lean recycle gas; recycling at least a portion of the hydrogen-rich recycle gas to the syngas; and recycling at least a portion of the hydrogen-lean recycle gas to the hydrocarbon, the effluent, or both.

13. A method for producing ammonia, comprising: reforming a first hydrocarbon in the presence of steam, nitrogen, and one or more first catalysts in a first reformer to produce a first effluent comprising about 40 mol % to about 80 mol % hydrogen, about 5 mol % to about 20 mol % carbon monoxide, about 5 mol % to about 20 mol % carbon dioxide, and about 20 mol % to about 40 mol % nitrogen; reforming a second hydrocarbon in the presence of steam and one or more second catalysts in a second reformer to produce a second effluent comprising about 45 mol % to about 80 mol % hydrogen, wherein heat from the first effluent is transferred to the second hydrocarbon to support reforming of the second hydrocarbon; combining the first effluent and the second effluent to provide a syngas comprising about 10 mol % or less methane, from about 50 mol % to about 80 mol % hydrogen, about 20 mol % to about 50 mol % nitrogen, from about 7 mol % to about 15 mol % carbon monoxide, and about 5 mol % to about 20 mol % carbon dioxide; converting at least a portion of the nitrogen and hydrogen in the syngas to ammonia to produce an ammonia effluent; separating the ammonia effluent to produce an ammonia product and a purge gas comprising nitrogen; and recycling at least a portion of the purge gas to the first hydrocarbon, the first effluent, the second hydrocarbon, or any combination thereof 14. The method of paragraph 13, wherein the first reformer comprises an autothermal reformer and the second reformer comprises a reforming exchanger.

15. The method of paragraph 13 or 14, wherein reforming the first hydrocarbon comprises combusting a first portion of the first hydrocarbon in the presence of air to produce heat, wherein a second portion of the first hydrocarbon is reformed in the presence of the heat, steam, nitrogen, and one or more first catalysts to produce the first effluent.

16. A system for producing ammonia, comprising: a first reformer adapted to reform a hydrocarbon in the presence of steam and one or more first catalysts to produce an effluent comprising about 5 mol % to about 40 mol % of the hydrocarbon, about 5 mol % to about 20 mol % carbon monoxide, about 5 mol % to about 20 mol % carbon dioxide, and about 50 mol % to about 80 mol % hydrogen; a second reformer adapted to reform the effluent in the presence one or more second catalysts to produce a syngas comprising about 4 mol % or less methane, about 50 mol % to about 80 mol % hydrogen, about 20 mol % to about 50 mol % nitrogen, about 5 mol % to about 20 mol % carbon monoxide, and about 5 mol % to about 20 mol % carbon dioxide, wherein at least one of the hydrocarbon and the effluent is also reformed in the presence of nitrogen; an ammonia synthesis unit adapted to convert at least a portion of the hydrogen and nitrogen in the syngas to ammonia to produce an ammonia product and a purge gas comprising nitrogen; and a recycle line adapted to recycle at least a portion of the purge gas to the hydrocarbon, the effluent, or a combination thereof.

17. The system of paragraph 16, further comprising a purge gas recovery unit adapted to separate the purge gas into a hydrogen-rich recycle and a hydrogen-lean recycle, wherein at least a portion of the hydrogen-lean recycle is recycled via the recycle line to the hydrocarbon, the effluent, the syngas, or any combination thereof.

18. The system of paragraphs 16 or 17, further comprising a purification unit adapted to convert at least a portion of the carbon monoxide in the syngas to carbon dioxide and then separate at least a portion of the carbon dioxide from the syngas to produce a carbon dioxide purge gas and a purified syngas having less than about 0.3 mol % carbon monoxide and less than about 0.1 mol % carbon dioxide.

19. The system according to any of paragraphs 16 to 18, wherein the first reformer comprises a steam methane reformer and the second reformer comprises an autothermal reformer.

20. The system according to any of paragraphs 16 to 19, wherein the first reformer comprises an autothermal reformer and the second reformer comprises a reforming exchanger.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing ammonia, comprising:
reforming a hydrocarbon comprising methane in a first reaction zone in the presence of one or more first catalysts and steam at conditions sufficient to produce an effluent comprising about 10 mol % to about 40 mol % non-reformed methane, about 5 mol % to about 20 mol % carbon monoxide, about 10 mol % to about 20 mol % carbon dioxide, and about 40 mol % to about 60 mol % hydrogen;
reforming the effluent in a second reaction zone in the presence of one or more second catalysts and nitrogen at conditions sufficient to produce a syngas comprising about 10 mol % or less non-reformed methane, about 40 mol % to about 80 mol % hydrogen, about 20 mol % to about 40 mol % nitrogen, about 5 mol % to about 20 mol % carbon monoxide, and about 5 mol % to about 20 mol % carbon dioxide;
introducing an oxidant into the second reaction zone;
converting at least a portion of the nitrogen and hydrogen in the syngas to ammonia to produce an ammonia effluent;
separating the ammonia effluent to produce an ammonia product and a purge gas comprising nitrogen;
separating the purge gas comprising nitrogen to produce a hydrogen-rich recycle gas and a hydrogen-lean recycle gas;
comparing a temperature associated with the oxidant with a predetermined temperature; and
recycling a first portion of the hydrogen-lean recycle gas to the effluent from the first reaction zone separately from the oxidant introduced into the second reaction zone and only if a temperature associated with the oxidant is above the predetermined temperature, wherein the hydrogen-lean recycle gas comprises 10 mol % to 70 mol % nitrogen.

2. The method of claim 1, wherein the first reaction zone comprises one or more catalyst-containing tubes and the second reaction zone comprises one or more catalyst-containing beds.

3. The method of claim 1, wherein reforming the effluent further comprises combusting a portion of the effluent in the presence of an oxidant to generate heat, wherein at least a portion of the heat is used to reform the effluent in the second reaction zone.

4. The method of claim 1, wherein reforming the hydrocarbon comprises combusting a fuel to generate heat and indirectly transferring at least a portion of the heat to the hydrocarbon in the first reaction zone.

5. The method of claim 4, further comprising recycling a second portion of the hydrogen-lean recycle gas to the fuel.

6. The method of claim 5, wherein the amount of the first portion of the hydrogen-lean recycle gas recycled to the hydrocarbon comprises about 30% to about 50% of the total amount of the hydrogen-lean recycle gas, and wherein the amount of the second portion of the hydrogen-lean recycle gas recycled to the fuel comprises about 50% to about 70% of the total amount of the purge gas.

7. The method of claim 1, further comprising:
shift converting at least a portion of the carbon monoxide in the syngas to carbon dioxide to provide a shift converted syngas; and
separating at least a portion of the carbon dioxide from the shift converted syngas to produce a carbon dioxide purge gas and a carbon dioxide-lean syngas prior to converting at least a portion of the nitrogen and hydrogen in the carbon dioxide-lean syngas to the ammonia effluent.

8. The method of claim 1, further comprising combusting a second portion of the hydrogen-lean recycle gas to generate heat; and indirectly transferring at least a portion of the heat to the first reaction zone.

9. The method of claim 1, wherein the syngas comprises from about 50 mol % to about 65 mol % hydrogen, about 5 mol % to about 15 mol % carbon monoxide, about 10 mol % to about 20 mol % carbon dioxide, about 20 to about 30 mol % nitrogen, and about 0.1 mol % to about 4 mol % non-reformed methane.

10. The method of claim 1, wherein reforming the effluent comprises combusting a first portion of the effluent in the presence of air to produce heat, wherein a second portion of the effluent is reformed in the second reaction zone in the presence of the heat and the one or more second catalysts.

11. The method of claim 1, wherein the hydrocarbon has a steam-to-carbon molar ratio ranging from about 2.7 to about 4.

12. A method for producing ammonia, comprising:
reforming a first hydrocarbon in the presence of steam, nitrogen, and one or more first catalysts in a first reformer to produce a first effluent comprising about 40 mol % to about 80 mol % hydrogen, about 5 mol % to about 20 mol % carbon monoxide, about 5 mol % to about 20 mol % carbon dioxide, and about 20 mol % to about 40 mol % nitrogen;
reforming a second hydrocarbon in the presence of steam and one or more second catalysts in a second reformer to produce a second effluent comprising about 45 mol % to about 80 mol % hydrogen, wherein heat from the first effluent is transferred to the second hydrocarbon to support reforming of the second hydrocarbon;

introducing an oxidant into the second reaction zone via a first line;

combining the first effluent and the second effluent to provide a syngas comprising about 10 mol % or less methane, from about 50 mol % to about 80 mol % hydrogen, about 20 mol % to about 50 mol % nitrogen, from about 7 mol % to about 15 mol % carbon monoxide, and about 5 mol % to about 20 mol % carbon dioxide;

converting at least a portion of the nitrogen and hydrogen in the syngas to ammonia to produce an ammonia effluent;

separating the ammonia effluent to produce an ammonia product and a purge gas comprising nitrogen;

separating the purge gas comprising nitrogen to produce a hydrogen-rich recycle gas and a hydrogen-lean recycle gas;

comparing a temperature associated with the oxidant with a predetermined temperature, wherein the predetermined temperature relates to the air ambient to the ammonia production; and recycling at least a portion of the hydrogen-lean recycle gas to the first effluent in a second line if a temperature associated with the oxidant is above a predetermined temperature, wherein the hydrogen-lean recycle gas comprises 10 mol % to 70 mol % nitrogen and wherein the first line and the second line are separate.

13. The method of claim 12, wherein the first reformer comprises an autothermal reformer and the second reformer comprises a reforming exchanger.

14. The method of claim 12, wherein reforming the first hydrocarbon comprises combusting a first portion of the first hydrocarbon in the presence of air to produce heat, wherein a second portion of the first hydrocarbon is reformed in the presence of the heat, steam, nitrogen, and one or more first catalysts to produce the first effluent.

15. The method of claim 12, wherein the syngas is at a temperature of 650° C. to 825° C. when the first effluent and the second effluent are combined with one another to provide the syngas.

16. The method of claim 12, wherein reforming the first hydrocarbon comprises combusting a first portion of the first hydrocarbon in the presence of air to produce heat, wherein a second portion of the first hydrocarbon is reformed in the presence of the heat, steam, nitrogen, and one or more first catalysts to produce the first effluent, and wherein the first effluent is at a temperature of about 900° C. to about 1,100° C.

17. The method of claim 12, wherein reforming the first hydrocarbon comprises combusting a first portion of the first hydrocarbon in the presence of air to produce heat, wherein a second portion of the first hydrocarbon is reformed in the presence of the heat, steam, nitrogen, and one or more first catalysts to produce the first effluent, wherein the first effluent is at a temperature of about 900° C. to about 1,100° C., and wherein the syngas is at a temperature of about 650° C. to about 825° C. when the first effluent and the second effluent are combined with one another to provide the syngas.

18. The method of claim 12, wherein the first hydrocarbon comprises methane, wherein the first effluent comprises about 50 mol % to about 60 mol % hydrogen, about 10 mol % to about 15 mol % carbon monoxide, about 10 mol % to about 15 mol % carbon dioxide, about 25 mol % to about 30 mol % nitrogen, and less than about 1 mol % non-reformed methane, wherein the second hydrocarbon comprises methane, and wherein the second effluent comprises about 70 mol % to about 78 mol % hydrogen and further comprises about 12 mol % to about 16 mol % carbon monoxide, about 6 mol % to about 8 mol % carbon dioxide, and less than about 2 mol % non-reformed methane.

19. The method of claim 12, wherein the first hydrocarbon comprises methane, wherein reforming the first hydrocarbon comprises combusting a first portion of the first hydrocarbon in the presence of air to produce heat, wherein a second portion of the first hydrocarbon is reformed in the presence of the heat, steam, nitrogen, and one or more first catalysts to produce the first effluent, wherein the first effluent is at a temperature of about 900° C. to about 1,100° C., wherein the first effluent comprises about 50 mol % to about 60 mol % hydrogen, about 10 mol % to about 15 mol % carbon monoxide, about 10 mol % to about 15 mol % carbon dioxide, about 25 mol % to about 30 mol % nitrogen, and less than about 1 mol % non-reformed methane, wherein the second hydrocarbon comprises methane, wherein the second effluent comprises about 70 mol % to about 78 mol % hydrogen and further comprises about 12 mol % to about 16 mol % carbon monoxide, about 6 mol % to about 8 mol % carbon dioxide, and less than about 2 mol % non-reformed methane, and wherein the syngas is at a temperature of about 650° C. to about 825° C. when the first effluent and the second effluent are combined with one another to provide the syngas.

20. The method of claim 1, wherein the hydrogen-lean recycle gas further comprises about 1 mol % to about 20 mol % methane, about 1 mol % to about 20 mol % argon, and about 5 mol % to about 60 mol % hydrogen.

21. The method of claim 1, wherein the hydrogen-lean recycle gas comprises about 10 mol % to about 55 mol % nitrogen and about 1 mol % to about 20 mol % argon.

22. The method of claim 12, wherein the hydrogen-lean recycle gas further comprises about 1 mol % to about 20 mol % methane, about 1 mol % to about 20 mol % argon, and about 5 mol % to about 60 mol % hydrogen.

23. A method for producing ammonia, comprising:

reforming a first hydrocarbon in the presence of steam, nitrogen, and one or more first catalysts in one or more catalyst containing tubes of a first reformer to produce a first effluent at a temperature of about 900° C. to about 1,100° C., wherein the first effluent comprises about 40 mol % to about 80 mol % hydrogen, about 5 mol % to about 20 mol % carbon monoxide, about 5 mol % to about 20 mol % carbon dioxide, and about 20 mol % to about 40 mol % nitrogen;

reforming a second hydrocarbon in the presence of steam and one or more second catalysts in one or more catalyst containing beds of a second reformer to produce a second effluent comprising about 45 mol % to about 80 mol % hydrogen, wherein heat from the first effluent is transferred to the second hydrocarbon to support reforming of the second hydrocarbon;

introducing an oxidant into the second reaction zone;

combining the first effluent and the second effluent to provide a syngas comprising about 10 mol % or less methane, from about 50 mol % to about 80 mol % hydrogen, about 20 mol % to about 50 mol % nitrogen, from about 7 mol % to about 15 mol % carbon monoxide, about 5 mol % to about 20 mol % carbon dioxide, and less than about 1 mol % argon;

converting at least a portion of the nitrogen and hydrogen in the syngas to ammonia to produce an ammonia effluent;

separating the ammonia effluent to produce an ammonia product and a purge gas comprising nitrogen;

separating the purge gas comprising nitrogen to produce a hydrogen-rich recycle gas and a hydrogen-lean recycle gas; and recycling at least a portion of the hydrogen-lean recycle gas to the first effluent if a temperature associated with the oxidant is above a predetermined temperature not recycling the at least a portion of the hydrogen-lean recycle gas to the first effluent if the temperature associated with the oxidant is below the predetermined temperature, wherein the hydrogen-lean recycle gas comprises 10 mol % to 55 mol % nitrogen, 5 mol % to 15 mol % methane, and 5 mol % to 45 mol % hydrogen.

24. The method of claim 23, wherein the syngas is at a temperature of 650° C. to 825° C. when the first effluent and the second effluent are combined with one another to provide the syngas.

25. The method of claim 23, wherein the first reformer comprises an autothermal reformer and the second reformer comprises a reforming exchanger, and wherein reforming the first hydrocarbon comprises combusting a first portion of the first hydrocarbon in the presence of air to produce heat, wherein a second portion of the first hydrocarbon is reformed in the presence of the heat, steam, nitrogen, and one or more first catalysts to produce the first effluent, and wherein the first effluent is at a temperature of 900° C. to 1,100° C.

* * * * *